UNITED STATES PATENT OFFICE.

JACINTO AVERHOFF, OF HAVANA, CUBA.

MEDICAL COMPOUND.

SPECIFICATION forming part of Letters Patent No. 254,448, dated March 7, 1882.

Application filed November 5, 1881. (No specimens.)

*To all whom it may concern:*

Be it known that I, JACINTO AVERHOFF, a subject of the King of Spain, and a resident of the city of Havana, Island of Cuba, have invented a new and useful composition of matter to be used principally as a medicament for wounds, megrim, headaches, neuralgia, rheumatism, ulcers, sores, bruises, swellings, burns, and other similar complaints, of which the following is a specification.

My composition consists of the following ingredients, combined in the proportions stated: frankincense, one-half ounce; mastic drops, one-half ounce; choice myrrh, one-half ounce; Socotrine aloes, one and one-half ounce, all thoroughly pulverized, twenty-four ounces of alcohol of about 38°. The said ingredients are to be thoroughly mixed together in the proportions above stated, in suitable quantities of each, as required, and mingled by frequent agitation during a period of about two weeks. The said composition is then carefully filtered through paper and bottled for use.

The said composition is intended to be used principally as an embrocation, and applied externally to the parts affected by means of a cloth, sponge, rags, or otherwise.

I am aware that the last three elements—viz., alcohol, aloes, and myrrh—are used together in the Elixir Proprietas; also that aloes, myrrh, and mastic, with other ingredients, have been used together in pills.

What I claim, and desire to secure by Letters Patent of the United States, is—

The herein-described composition of matter to be used principally as a medicament or embrocation to cure wounds, headache, megrim, neuralgia, rheumatism, ulcers, sores, bruises, swellings, burns, and other similar complaints, consisting of frankincense, mastic drops, myrrh, aloes, and alcohol in the proportions specified.

Havana, October 28, 1881.

JACINTO AVERHOFF.

Witnesses:
 JOS. A. SPRINGER,
  *Consular Clerk.*
 L. BETANCOURT.